W. A. HINDS.
APPARATUS FOR REPAIRING TIRES.
APPLICATION FILED OCT. 21, 1908.
1,068,653.                                              Patented July 29, 1913.
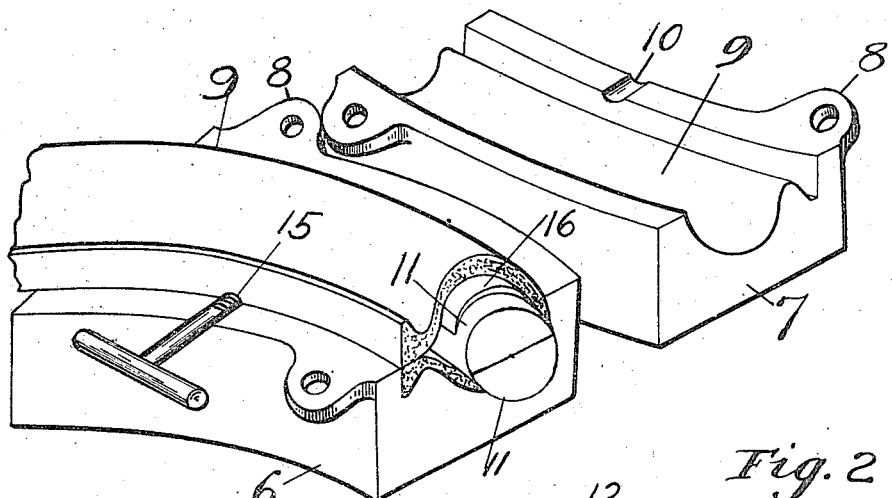
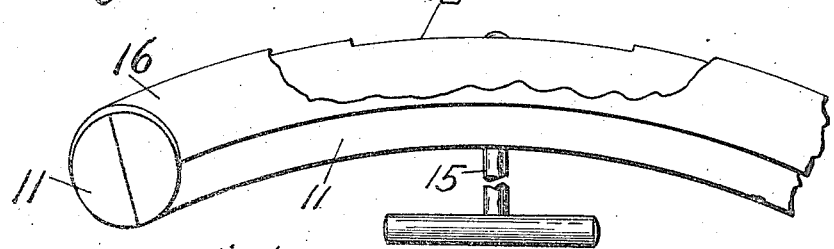
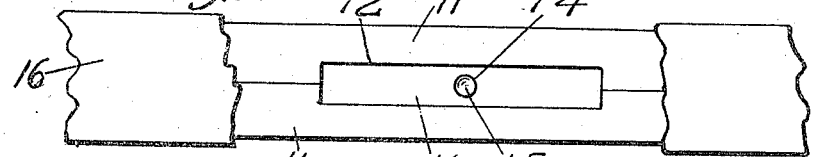
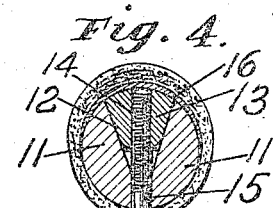
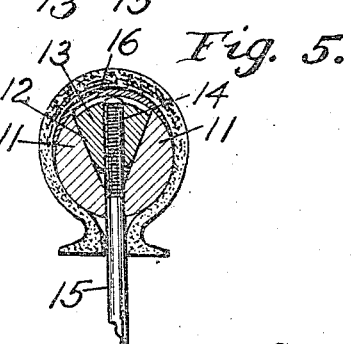

UNITED STATES PATENT OFFICE.

WILLIAM A. HINDS, OF HARTFORD, CONNECTICUT, ASSIGNOR OF ONE-HALF TO SHERMAN H. HOVERTER AND ONE-HALF TO HARVEY E. EBERLY, BOTH OF READING, PENNSYLVANIA.

APPARATUS FOR REPAIRING TIRES.

1,068,653.  Specification of Letters Patent.  Patented July 29, 1913.

Application filed October 21, 1908. Serial No. 458,843.

*To all whom it may concern:*

Be it known that I, WILLIAM A. HINDS, a citizen of the United States, and a resident of Hartford, in the county of Hartford and State of Connecticut, have invented a new and Improved Apparatus for Repairing Tires, of which the following is a specification.

My invention relates to the class of devices used for repairing tires of fibrous material now commonly used upon automobiles, bicycles and like vehicles, or what are known as pneumatic tires, the invention being especially applicable in repairing the shoe or case of what is known as an inner tube tire.

The object of the invention is to provide a device in the use of which the repair of a tire may be effected with little liability of failure or the production of an imperfect repair; and a further object of the invention is the production of a device of simple and comparatively cheap construction and one capable of very extended use as to time or number of repair operations. A device in the use of which these objects may be attained is illustrated in the accompanying drawings, in which—

Figure 1 is a perspective view of two sections of a mold or form showing a portion of a shoe in one of said parts and my improved repair device in place in said shoe. Fig. 2 is a perspective view of the repair device with parts broken away to show construction. Fig. 3 is a top plan view of the same with parts broken away to show construction, the term "top" being employed throughout the specification to denote that portion corresponding to the tread of the tire. Fig. 4 is a detail view in cross-section through a shoe showing my improved repair device in place. Fig. 5 is a like view showing the apparatus under compression.

In the repair of pneumatic tires, and especially the shoes of such tires known as "inner tube" tires the outer layer, usually of rubber, is removed from a point at the bead on one side to the bead on the opposite side and for a slight distance extending on opposite sides of the cut or like opening to be repaired and in a direction lengthwise of the shoe. Strips of canvas are then placed over the fracture on the inner surface of the shoe and a final strip is then applied extending from some point within the shoe across the break or fracture around the bead on the side on which the break occurs and around the outer surface of the shoe to the bead on the opposite side, filling the cavity made by removing the rubber. Rubber is then placed over the whole of that portion of the outer surface of the shoe for some distance on each side of the inserted pieces and the whole is then placed in a mold or form and proper pressure applied to the inside of the shoe during vulcanizing to secure a proper repair. In effecting such repairs gases are formed from certain substances as gasolene, which accumulate between the different layers of the shoe at the point of repair. It is extremely essential that these gases shall be completely expelled before heat is applied, and also that an extreme degree of pressure shall be applied and maintained during the process of vulcanization. I have provided a device by means of which these results may be surely effected and by the use of which other important advantages are gained, such an apparatus being illustrated herein and in which the numeral 6 denotes one section of a form and 7 the opposite section, these sections being provided with ears 8 having openings for the reception of bolts or like means for securing the two sections together. A recess 9 is made in each section of the form, the opening formed by these recesses when the two sections of the form are placed together being of a shape to correspond to the shape of the outer surface of the shoe to be received within the recess. A groove 10 may be employed if necessary for the reception of the shank of a key to be hereinafter described.

An apparatus for expanding the shoe and holding it firmly and rigidly in place during the vulcanizing process is provided, and this includes a core preferably formed of two sections 11. These sections are of a shape in cross-section corresponding practically to that of the opening within the shoe to be repaired, that is, if the opening within the shoe is practically round the two sections of the core when placed together will be practically round in cross-section, although it will be understood that they are not necessarily of the exact form of the opening in the shoe.

Each of the sections 11 are cut away on their meeting faces, the cuts in each of the sections being of corresponding shape and forming, when the two sections are placed together, a recess 12. This recess is wider at the top than at the bottom, being of wedge-shape in cross-section, as shown in Figs. 4 and 5. A wedge 13 fits within the recess 12, this wedge having a threaded opening 14 for the reception of a threaded key 15, which passes between the sections 11 into the wedge.

A shoe 16 is arranged to be located on the outer surface of the two sections 11, overlying the seam between them and extending for a considerable distance beyond the opposite ends of the recess 12, this shoe conforming practically to the shape of the outer surface of the sections 11. This shoe forms an abutment against which the end of the key 15 thrusts in the operation of the expander, the key passing through the threaded opening 14 and its shank being located in the opening made up of the grooves 10 in the form, if such grooves shall be required.

The operation of the device will be readily understood, it being noted that the material to effect the repair having been placed in proper position the expander is located within the shoe and the whole placed within the form sections that are securely bound together. By now turning the key 15 it is projected through the wedge 13, its end thrusting against the shoe 16 which latter is forced out against the inner surface of the tire until it obtains a proper seat. A further rotation of the key will cause the wedge 13 to move inward, forcing the sections of the core 11 apart. This outward movement of the shoe and also of the core sections causes the general shape of the tire shoe to be maintained and any degree of compression desired may be had by means of the key. This compression will entirely force all gases which may have accumulated out from between the parts or plies of the tire shoe, and a further compression will be obtained owing to the expansion of the parts as the tire is subjected to heat in the vulcanizing process.

The apparatus provides means for surely holding the parts of the expander to maintain the required pressure, there being no danger of any relaxation of parts, and the nature of its construction is such as will enable the device to be employed practically indefinitely for repair purposes.

While I have shown and described herein the method preferred at the present time for carrying out my invention, it will be understood that this construction may be departed from to a greater or lesser extent without avoiding the invention, and I do not therefore limit myself to the construction of parts herein shown and described.

I claim—

1. An apparatus of the class described comprising a form, an arcuate expandible core therein constructed to gap longitudinally open when expanded, a shoe for covering the gap of the core, means within the core for expanding the same, and an operating element extending transversely to and entering the form and core and operatively related with the said expanding means in the core and with the said shoe.

2. An expander comprising an expandible core which gaps open when expanded, means within and acting directly on the core for expanding the same, and a shoe disposed over the gap of the core and on which the said means directly acts during the expanding of the core to apply pressure to the article to be treated.

3. An expander including a sectional core and a shoe located on the surface of said sections, each of said parts composing a portion of a continuous surface of the same general shape as the inner walls of a recess in an article to be treated, said parts being arranged to preserve such shape on separation, a wedge to separate the core members, and means for operating the wedge and for separating the shoe from said members.

4. An expander comprising an expandible core formed in longitudinal sections, a member slidable between and transversely to the sections for separating the same, a longitudinally movable element passing transversely between the core sections for actuating the same, and a shoe disposed on and extending the full length of the core to cover the space between the sections thereof and movable outwardly by the said element.

5. An expander including a sectional core with a wedge-shaped recess between said sections and a shoe extending across the line of division between said members, the shoe and each section forming a portion of a continuous surface of the same general shape as the walls of a recess in an article to be treated, and a key for operating the wedge and also to thrust against said shoe to force it away from the core sections and against the walls of said article.

6. A form having a recess to receive an article to be treated, a sectional core and a shoe, said sections being arranged for separation and the shoe covering the space at the separated edge of the sections, and means for separating the sections of the core and for moving the shoe away from the surface of said sections.

7. An expander comprising a core composed of sections, a shoe on the outside of the core, a screw passing transversely through the core and having its end engaging the shoe, and means between the screw and core sections whereby the latter and shoe are moved outwardly by the turning of the screw.

8. An expander including a sectional core divided lengthwise with a wedge-shaped recess extending from the side surface inward, a wedge to fit said recess and operating to force the core sections apart, a shoe covering the joint between the core sections, and a threaded key passing through the wedge and abutting against the inner surface of the shoe.

9. A form having a recess for an article to be treated, an expander fitting the recess in the form and including a sectional core divided lengthwise with a wedge-shaped recess between the sections extending from the side surface inward, a wedge to fit said recess, a shoe covering the joint between the core sections, and means to force the core sections apart and the shoe outward in transverse directions.

10. An expander comprising an expandible core adapted to gap open when expanded, a shoe for covering the gap, a longitudinally movable element extending into the core transversely thereof and having its inner end bearing on the shoe for moving the same outwardly, and means through which the element operates to expand the core by the longitudinal movement of the element in the direction to move the shoe.

11. An expander comprising a core constructed to spread open in expanding, a shoe applied to the open side of the core and wholly detached from the latter, a longitudinally movable screw extending into the core transversely thereof and with its inner end bearing on the shoe, and means threaded to the screw and operating on the core for expanding the same.

12. An expander comprising a core divided longitudinally to form two symmetrical parts and another part partially embracing them, and means for moving the symmetrical parts outwardly in opposite directions and the embracing part outwardly in a different direction whereby the core is expanded in cross section.

13. The combination of an expander comprising a core divided longitudinally to form two symmetrical parts arcuate in length and an arcuate shoe partially embracing the said parts to cover the gap between the same when separated, with means acting directly on the said parts and shoe for simultaneously moving them outwardly for expanding the core cross-sectionally.

WILLIAM A. HINDS.

Witnesses:
ARTHUR B. JENKINS,
LENA E. BERKOVITCH.